US011823001B2

(12) United States Patent
Wang et al.

(10) Patent No.: US 11,823,001 B2
(45) Date of Patent: Nov. 21, 2023

(54) COMPUTER IMPLEMENTED METHOD FOR RECOGNIZING ANSWER SHEET

(71) Applicants: Yuhong Wang, Beijing (CN); Ziming Wang, Beijing (CN)

(72) Inventors: Yuhong Wang, Beijing (CN); Ziming Wang, Beijing (CN)

( * ) Notice: Subject to any disclaimer, the term of this patent is extended or adjusted under 35 U.S.C. 154(b) by 0 days.

(21) Appl. No.: 17/999,207

(22) PCT Filed: Jun. 28, 2021

(86) PCT No.: PCT/CN2021/102686
§ 371 (c)(1),
(2) Date: Nov. 17, 2022

(87) PCT Pub. No.: WO2022/151665
PCT Pub. Date: Jul. 21, 2022

(65) Prior Publication Data
US 2023/0196042 A1    Jun. 22, 2023

(30) Foreign Application Priority Data
Jan. 18, 2021    (CN) .......................... 202110062173.6

(51) Int. Cl.
*G06K 7/14* (2006.01)
(52) U.S. Cl.
CPC ................................ *G06K 7/1408* (2013.01)
(58) Field of Classification Search
CPC .................................................... G06K 7/1408
See application file for complete search history.

(56) References Cited

U.S. PATENT DOCUMENTS

| 5,971,283 | A | 10/1999 | Sawaguchi |
| 2021/0240958 | A1* | 8/2021 | Mizoguchi ....... G06K 19/06037 |

(Continued)

FOREIGN PATENT DOCUMENTS

| CN | 1104791 A | 7/1995 |
| CN | 1472627 A | 2/2004 |

(Continued)

OTHER PUBLICATIONS

CN104881469A Data exporting method and device, 6 pages. (Year: 2023).*

(Continued)

*Primary Examiner* — Tuyen K Vo
(74) *Attorney, Agent, or Firm* — NKL Law; Allen Xue

(57) ABSTRACT

A computer implemented method for recognizing an answer sheet includes the steps of: reading a filled answer sheet comprising at least one set of graphical codes; locating each set of graphical codes in the answer sheet; a set of graphical codes comprising one grid or two grids, wherein for each set of graphical codes, if the function mark of the first grid is filled, two sets or four sets of 8-digit binary codes are obtained according to the filling state of each of the filling areas in each grid of the set of graphical codes; and recognizing the corresponding characters according to the encoding format determined by the encoding format mark. If the function mark in the first grid is un-filled, the filling states of the eight icons of the encoding format mark are converted to the third set of binary codes for character recognition.

12 Claims, 10 Drawing Sheets

(56) References Cited

U.S. PATENT DOCUMENTS

2022/0134841 A1\* 5/2022 Jeong .................... B60H 1/143
62/79
2022/0138446 A1\* 5/2022 Busby ............. G06K 19/06037
235/462.1

FOREIGN PATENT DOCUMENTS

| CN | 112801081 A | 5/2021 | |
|---|---|---|---|
| EP | 665510 A1 \* | 8/1995 | ....... G06K 19/06037 |
| GB | 2558789 A | 7/2018 | |

OTHER PUBLICATIONS

CN1472627A Binary graphics code encoding method and character composed rule thereof, 4 pages. (Year: 2023).\*
CN1104791A Two dimensional code for processing data, 5 pages. (Year: 2023).\*

\* cited by examiner

COMPUTER IMPLEMENTED METHOD FOR RECOGNIZING ANSWER SHEET

TECHNICAL FIELD

The present disclosure relates to the technical field of computer recognition, in particular to a computer method for recognizing an answer sheet.

BACKGROUND

With development of electronic information, more and more work has been replaced by computer, for example, computer automatic recognition for an answer sheet to complete an automatic marking has gradually replaced the manual marking.

However, the existing answer sheet only supports to fill in objective questions (English letters such as A, B, C, D), which does not support to fill in other characters including Chinese characters in names and subjective question answers. Accordingly, the computer cannot recognize other characters including Chinese characters in the answer sheet, which results in a limited function and applicable scope of the answer sheet. Moreover, as the name cannot be recognized, an automatic recordation and summary of examinee's score cannot be realized after automatic marking by computer, and the degree of automation is low.

SUMMARY OF THE INVENTION

It's an object of the present disclosure to provide a computer method for recognizing an answer sheet so as to expand the applicable scope of computer marking and to realize full-automatic computer marking.

In order to achieve the above objectives, the present disclosure discloses solutions as follows:

The present disclosure provides a computer method for recognizing an answer sheet, including: recognizing, based on at least the two sets of 8-digit binary codes and an encoding format, a character corresponding to a graphical code.

Further, determining the encoding format corresponding to the graphical codes includes: taking a default encoding format as the encoding format corresponding to the graphical code, wherein the default encoding format is GBK.

Further, each of the grids includes an encoding format mark and a function mark. The encoding format mark includes eight icons numbered in sequence and respectively located at four midpoints of four sides of the grid and at four intersections of the four midpoint connecting lines and the two diagonal lines. The encoding format mark has two states of filled state and un-filled state. The function mark is an icon located at the center of the grid and has two states of filled state and un-filled state.

For each set of graphical codes, after reading the state of each of the filling areas in the first grid in the set of graphical codes according to the number sequence of the filling areas, further includes: reading the state of the function mark of the first grid, and reading the state of each icon of the encoding format mark of the first grid according to the number sequence of the icons of the encoding format mark.

Accordingly, determining the encoding format corresponding to the graphical codes includes:
if the function mark in the first grid is un-filled, the encoding format corresponding to the set of graphical codes is ASCII or UTF-8;
if the function mark of the first grid is filled, the encoding format corresponding to the set of graphical codes is determined according to the state of each icon of the encoding format mark in the first grid.

Accordingly, based on at least two sets of 8-digit binary codes and the encoding format, recognizing a character corresponding to each of the graphical codes includes:
if the function mark of the first grid is un-filled, the states of icons of the encoding format mark in the first grid are converted to a third set of 8-digit binary codes; and based on three single-byte ASCII codes or one three-byte UTF-8 code represented by three sets of 8-digit binary code, three ASCII characters or one Unicode character corresponding to the set of graphical codes are recognized;
if the function mark of the first grid is filled, when each set of graphical codes includes one grid, based on the two sets of 8-digit binary codes and the encoding format, a character corresponding to the set of graphical codes is recognized; when each set of graphical codes includes two grids, according to a number sequence of the filling areas, the states of the filling areas in the second grid of the set of graphical codes are read so as to obtain another two sets of 8-digit binary codes composed of 16 digits; and, based on the encoding format and four sets of 8-digit binary codes composed of the two sets of 8-digit binary codes and another two sets of 8-digit binary code, a character corresponding to the set of graphical codes is recognized.

Further, based on three single-byte ASCII codes or one three-byte UTF-8 code represented by three sets of 8-digit binary code, recognizing three ASCII characters or one Unicode character corresponding to the set of graphical codes includes:
  when a first digit of each set of 8-digit binary codes is 0, the set of graphical codes corresponds to ASCII character set, and based on the three ASCII codes represented by the three sets of 8-digit binary code, three ASCII characters corresponding to the set of graphical codes are recognized;
  when high-order digit of the first set of 8-digit binary codes is 1110, the set of graphical codes corresponds to Unicode character set and the encoding format is UTF-8; based on the three-byte UTF-8 code represented by the three sets of 8-digit binary code, one Unicode character corresponding to the set of graphical codes is recognized.

Further, according to the state of each icon of the encoding format mark in the first grid, recognizing the encoding format corresponding to the graphical codes includes: obtaining a first relationship between the state of the encoding format mark and the encoding format; and, determining the encoding format corresponding to the graphical codes according to the state of each icon of the encoding format mark in the first grid and the first relationship.

Further, based on the two sets of 8-digit binary codes and the encoding format, recognizing a character corresponding to the set of graphical codes includes:
  if the encoding format encodes one character based on a single byte, two characters corresponding to the set of graphical codes are recognized based on an encoding value under the encoding format represented by each set of 8-digit binary code;
  if the encoding format encodes one character based on double bytes, one character corresponding to the set of graphical codes is recognized based on an encoding value under the encoding format represented by the two sets of 8-digit binary code.

Further, the encoding format of encoding one character based on a single byte includes at least one of UTF-8, ASCII, and sing-byte GB18030. The encoding format of encoding one character based on double bytes includes at least one of UTF-8, UTF-16LE, UTF-16BE, ANSI, UCS-2, double-byte GB18030, GBK, GB2312 and BIG5.

Further, based on the encoding format and four sets of 8-digit binary codes composed of the two sets of 8-digit binary codes and another two sets of 8-digit binary codes and the encoding format, recognizing a character corresponding to the set of graphical codes includes:

if the encoding format encodes one character based on four bytes, based on an encoding value under the encoding format represented by the four sets of 8-digit binary codes composed of the two sets of 8-digit binary codes and another two sets of 8-digit binary code, one character corresponding to the set of graphical codes is recognized.

The encoding format of encoding one character based on four bytes includes at least one of UTF-8, UTF-16BE, UTF-16LE, UTF-32BE, UTF-32BE, UCS-4 and four-byte GB18030.

Further, the grid includes a direction mark for locating top and bottom of the graphical code. The direction mark includes four icons (such as four squares or four triangles) numbered in sequence and located at four corners of the grid.

Accordingly, reading the state of each of the filling areas in the first grid of the set of graphical codes according to the number sequence of the filling areas includes: according to the number sequence of the icons of the direction mark, reading the state of each icon of the direction mark in the first grid in sequence; according to the state of each icon of the direction mark, determining the top and bottom of the first grid; and according to the top and bottom of the first grid, reading the state of each of the filling areas in the first grid in sequence.

Beneficial Effects of the Present Disclosure

1. The computer method for recognizing an answer sheet provided by the present disclosure graphically encodes characters such as Chinese characters. The object of filling characters such as Chinese characters can be achieved by filling the filling areas in the graphical codes, so that the characters such as Chinese characters in the name and subjective answer can be filled in the answer sheet. The computer recognizes the graphical codes to obtain the character encoding represented by the graphical codes so as to determine the characters filled in the answer sheet. The present disclosure realizes automatic computer recognition of the characters in the answer sheet, which expands the function of the answer sheet and also facilitates the automatic recordation and summary of the examinee's score after automatic marking by computer.

2. The graphical codes in the present disclosure has a compact structure. Each of the filling areas in filled or un-filled state is an effective graphic space occupation. Compared with other answer sheets (such as including four options of single choice questions, in fact, only one filling area is effective and other three filling areas are invalid), the graphical codes in the present disclosure has no invalid filling area occupation, improving the information capacity of an answer sheet and avoiding paper waste.

3. The graphical codes in the present disclosure supports the filling of Chinese characters and other characters under various encoding schemes, making it easier and more flexible for users to fill in. The graphical codes in the present disclosure can cover most common characters and has a wide range of application.

DETAILED DESCRIPTION OF DRAWINGS

The drawings used in the embodiments or the prior art will be briefly described herein to more clearly describe the embodiments of the present invention or the technical solutions in the prior art. Apparently, the following described drawings are merely some embodiments of the present invention. For those ordinary skilled in the art, other drawings can also be obtained according to the provided drawings without creative labor.

DETAILED DESCRIPTION OF PREFERRED EMBODIMENTS

A clear and complete description of the technical solutions in embodiments of the present invention will be presented in conjunction with the accompanying drawings. Obviously, the described embodiments are only some, but not all, embodiments of the invention. According to the embodiments of the present invention, all other embodiments obtained by those ordinary skilled in the art without creative labor should fall within the protection scope of the present invention.

Figure 1:
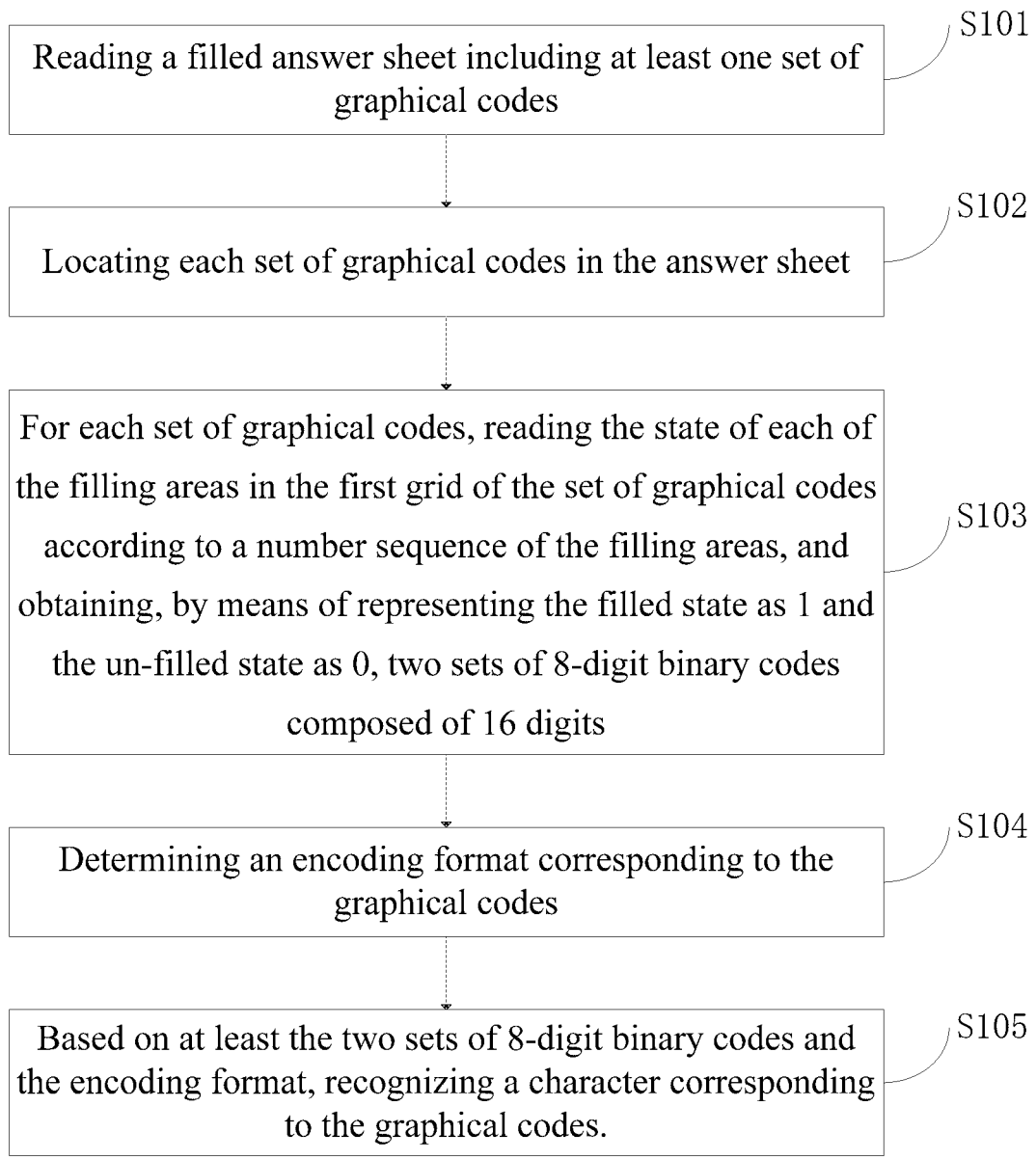
FIG. 1 is a flow diagram of computer method for recognizing an answer sheet disclosed in an embodiment of the present disclosure.

FIG. 1 shows a flow diagram of computer method for recognizing an answer sheet of the present disclosure, including the following steps of:

S101. reading a filled answer sheet including at least one set of graphical codes.

Each set of graphical codes includes at least one grid. The grid is a square divided, by two diagonal lines, two center lines and four midpoint connecting lines connecting midpoints of four sides of the grid, into 16 triangular areas numbered in sequence. Each of the triangular area is a filling area. Each filling area has two states of filled state and un-filled state.

Figure 2:
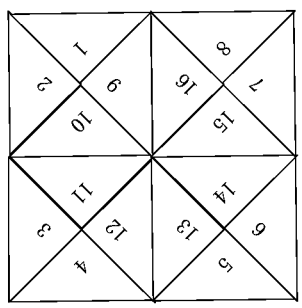
FIG. 2 is a schematic diagram of the graphical codes disclosed in an embodiment of the present disclosure.

FIG. 2 shows a schematic diagram of a graphical code in the embodiment of the present disclosure. Each set of graphical codes includes at least one grid. The grid is a square divided, by two diagonal lines, two center lines and four midpoint connecting lines connecting the midpoints of four sides of the grid, into 16 triangular areas numbered in sequence. Each of the triangular areas is a filling area. Each filling area has two states of filled state and un-filled state. The 16 filling areas are numbered in sequence. Preferably, the 16 filling areas can be numbered according to the following rules (the numbers are 1 to 16): the whole grid can be regarded as four quadrants divided by two center lines, numbering from the first quadrant and followed by the second, third and fourth quadrants, while numbering from the outside-ring to the inside-ring. The rules are convenient for mastering and memory, more importantly, places the two filling areas numbered as "1" and "9" at the bottom right of the first quadrant. "1" and "9" are the beginning digits of the 8-bit binary codes, and these two areas being of blank indicates that the code is ASCII code. Of course, the numbering rules of the filling areas can be clockwise, counterclockwise or other numbering rules, which is not limited in the present disclosure.

It should also be noted that when the answer sheet includes a plurality of sets of graphical codes, the arrangement of each set of graphical codes follows the writing habit: from left to right, from top to bottom. When a set of graphical codes includes two graphics, the first one is in the front and the second one follows closely behind. If the first graphic is arranged at the end of the previous line, the second graphic follows closely to arrange in the front of the next line. The arrangement of the graphical codes can also be vertical, and the recognized characters are consistent with the arrangement of the graphical codes.

It can be understood that each set of graphical codes can also be in other forms. For example, the graphical codes can be a circle evenly divided into 16 fan-shaped areas, and each of the fan-shaped areas is a filling area.

The above circular and square graphical codes can save space to the greatest extent. A circular or square graphical codes can represent one character, two characters, or even three characters.

For another example, the graphical codes can be two circles arranged together. Each circle is evenly divided into 8 fan-shaped areas, and each of the fan-shaped areas is a filling area. The 16-digit binary codes corresponding to the graphical codes is formed by splicing the 8-digit binary codes corresponding to the circular code arranged in the front and the 8-digit binary codes corresponding to the circular code arranged in the back.

For another example, the graphical codes can also be a deformed graphic of grid such as two first squares arranged together. Each first square is divided into eight triangles by two diagonal lines and two center lines, and each of the triangles is a filling area. The 16-digit binary codes corresponding to the graphical codes is formed by splicing the 8-digit binary codes corresponding to the first square arranged in the front and the 8-digit binary codes corresponding to the second square arranged in the back.

For another example, the graphical codes can also be a deformed grid such as four second squares arranged together. Each of the second squares is divided into four small squares by two center lines, and each of the small squares is a filling area. The 16-digit binary codes corresponding to the graphical codes are formed by splicing the 4-digit binary codes corresponding to the second square arranged in the first place, the 4-digit binary codes corresponding to the second square arranged in the second place, the 4-digit binary codes corresponding to the second square arranged in the third place and the 4-digit binary codes corresponding to the second square arranged in the fourth place.

For another example, the graphical codes can also be a deformed grid, such as two deformed grids arranged together. Each deformed grid is a square divided into four small squares by two center lines, and connecting the midpoints of the adjacent two sides of the square. Each of the right triangles in the two deformed grids is a filling area. The 16-digit binary codes corresponding to the graphical codes are formed by splicing the 8-digit binary codes corresponding to the deformed grid arranged in the front and the 8-digit binary codes corresponding to the deformed grid arranged in the back.

For another example, the graphic code can also be a deformed grid, such as four diagonal graphics arranged together. Each of the diagonal graphics is a square divided into four triangles by two diagonal lines. Each of the triangles is a filling area. The 16-digit binary codes corresponding to the graphical codes are formed by splicing the 4-digit binary codes corresponding to the diagonal graphic arranged in the first place, the 4-digit binary codes corresponding to the diagonal graphic arranged in the second place, the 4-digit binary codes corresponding to the diagonal graphic arranged in the third place and the 4-digit binary codes corresponding to the diagonal graphic arranged in the fourth place.

S102. locating each set of graphical codes in the answer sheet.

S103. for each set of graphical codes, reading the state of each of the filling areas in the first grid of the set of graphical codes according to a number sequence of the filling areas, and obtaining two sets of 8-digit binary codes composed of 16 digits by means of representing the filled state as 1 and the un-filled state as 0.

S104. determining an encoding format corresponding to the graphical codes.

A default encoding format is taken as the encoding format corresponding to the graphical code.

The default encoding format in this embodiment is GBK.

Figure 3:
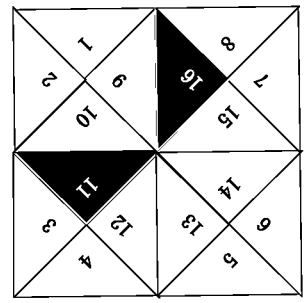
FIG. 3 is a schematic diagram of an example of the graphical codes disclosed in the embodiment of the present disclosure.
Figure 3:
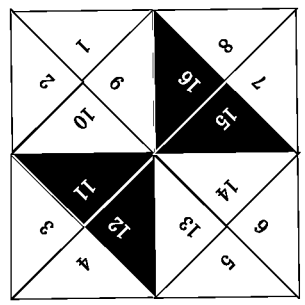
Figure 3:
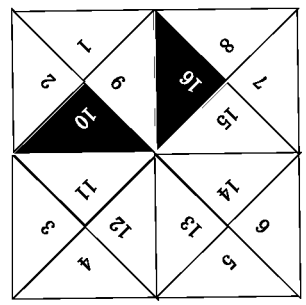
Figure 3:
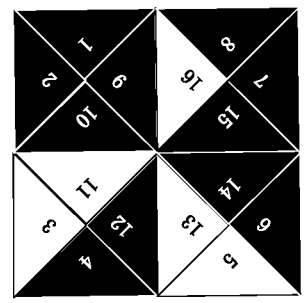

FIG. 3 shows an example of the graphical codes of the characters of "word", "A", "3" and "!" under the GBK encoding format. In FIG. 3, the graphical codes corresponding to the characters of "word", "A", "3" and "!" are in turn from left to right. The hexadecimal GBK encodes of the characters of "word", "A", "3" and "!" are respectively D7D6, 41, 33 and 21, and the corresponding binaries are respectively 11010111 11010110, 00000000 01000001, 00000000 00110011 and 00000000 00100001.

S105. based on the two sets of 8-digit binary codes and the encoding format, recognizing the character corresponding to each of the graphical codes.

Figure 4:
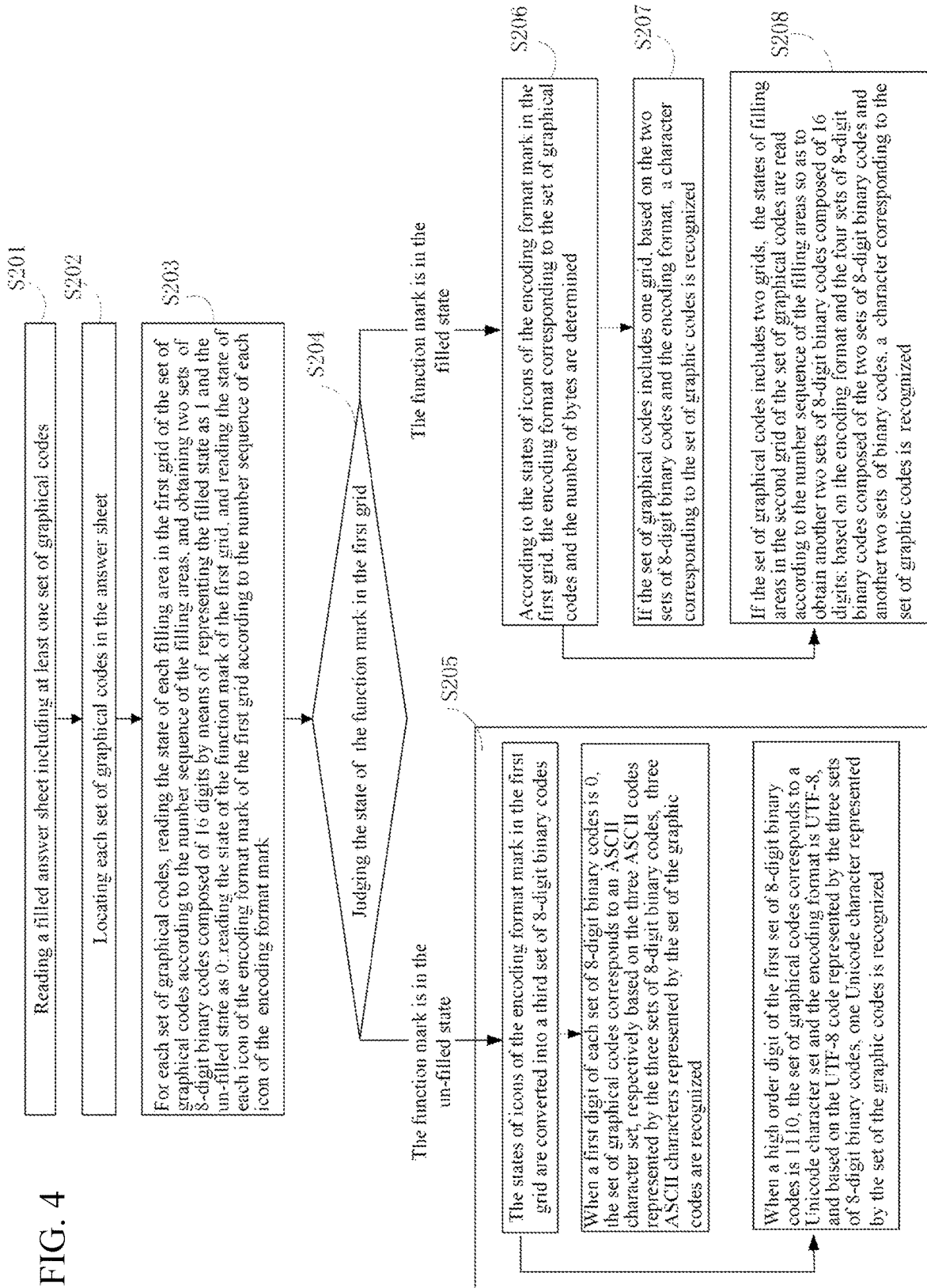
FIG. 4 is a flow diagram of computer method for recognizing an answer sheet disclosed in another embodiment of the present disclosure.

FIG. 4 shows another flow diagram of a machine method for recognizing an answer sheet, including the following steps of:

S201. reading a filled answer sheet including at least one set of graphical codes.

Figure 5:
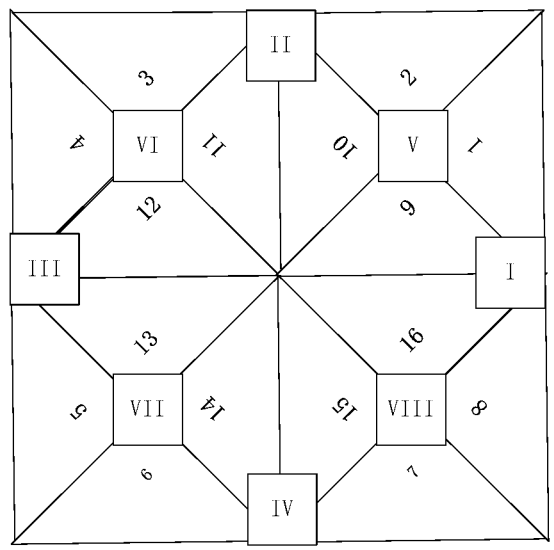
FIG. 5 is a schematic diagram of another graphical code disclosed in the embodiment of the present disclosure.

Each set of graphical codes includes at least one grid, as shown in FIG. 5. On the basis of the grid graphical codes shown in FIG. 2, it also includes an encoding format mark. The encoding format mark includes eight icons located at the midpoints of four sides of the grid and at the intersections of the four midpoint connecting lines and the two diagonal lines, and the icons are numbered from I to VIII in sequence. The icons can be square, triangle, circle or other shapes that can play a role of identification. The encoding format mark is used to identify the encoding format corresponding to the graphical codes or to expand the filling area. The encoding format can be ASCII, Unicode (UTF-8, UTF-16, UTF-32), UCS-2, UCS-4, GB 18030, GBK, GB2312, BIG5, etc. The encoding format mark has two states of filled state and un-filled state. The numbering rule of the encoding format mark can be clockwise, counterclockwise or other numbering rules, which is not limited in the present disclosure.

Figure 6:
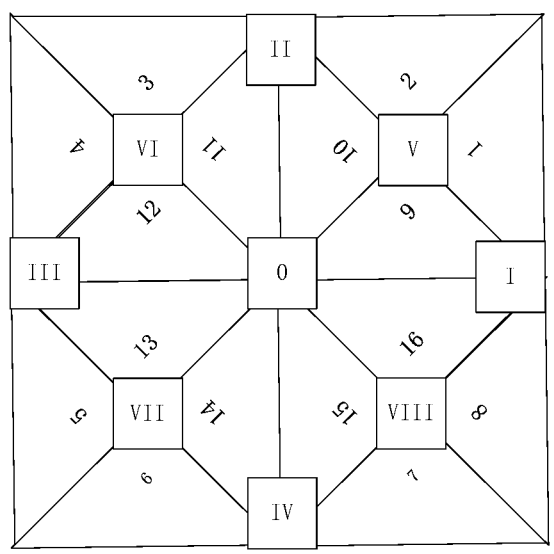
FIG. 6 is a schematic diagram of another graphical code disclosed in the embodiment of the present disclosure.

As shown in FIG. 6, on the basis of the grid graphical code shown in FIG. 2, the grid also includes a function mark for identifying the role of the encoding format mark. The function mark is an icon numbered as 0 located in the center of the grid. The icons can be squares, triangles, circles, or other shapes play a role of identification. The function mark has two states of filled state and un-filled state. When the function mark is filled, the eight encoding format marks are used to identify the encoding format corresponding to the graphical code. When the function mark is un-filled, the eight encoding format marks represent eight filling areas, and the 16 filling areas composed of 16 triangles are expanded into 24 filling areas.

Figure 7:
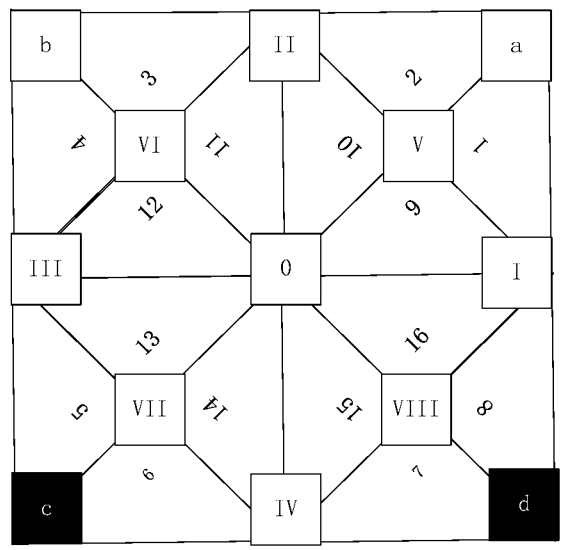
FIG. 7 is a schematic diagram of another graphical code disclosed in the embodiment of the present disclosure.
Figure 8:
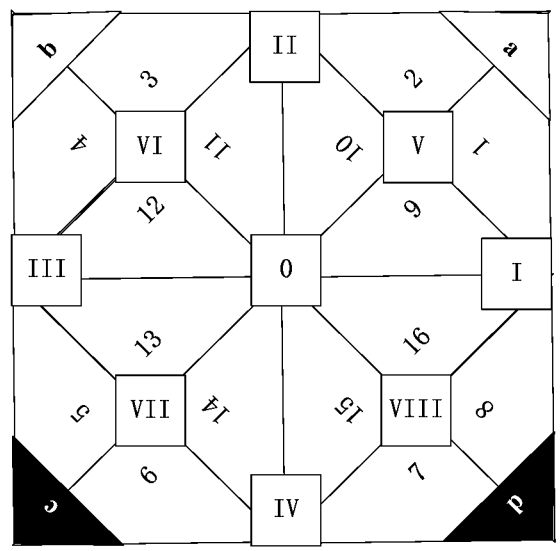
FIG. 8 is a schematic diagram of another graphical code disclosed in the embodiment of the present disclosure.

Preferably, in order to fill in the answer sheet correctly and facilitate computer recognition, for example, the direction of the graphical code should to be consistent with the direction of the text when the graphical code is used in conjunction with any text. Therefore, on the basis of the grid graphical code shown in FIG. 2, a direction mark is also included. As shown in FIG. 7 and FIG. 8, the direction mark is icons located at four corners of the grid. The four icons are successively numbered as a, b, c and d. The icons can be squares, triangles or other shapes that play a role of identification. The direction mark is used to locate top and bottom of the graphical code. For example, the icon numbered as a in the top right corner of the grid and the icon numbered as b in the top left corner are un-filled, and the icon numbered as c in the bottom left corner and the icon numbered as d in the bottom right corner are filled state. The side where two unfilled icons are located is the top side of the grid, and the side where two filled icons are located is the bottom side of the grid. Accordingly, when reading the state of each of the filling areas in the grid according to the number sequence of the filling areas, the state of each icon of the direction mark in the grid can be firstly read in number sequence; according to the state of each icon of the direction mark, the top and bottom of the grid is determined; and then according to the top and bottom of the grid, the state of each of the filling areas in the grid is read in sequence.

S202. locating each set of graphical codes in the answer sheet.

S203. for each set of graphical codes, reading the state of each of the filling areas in the first grid of the set of graphical codes according to the number sequence of the filling areas, and obtaining two sets of 8-digit binary codes composed of 16 digits by means of representing the filled state as 1 and the un-filled state as 0; reading the state of the function mark of the first grid, and reading the state of each icon of the encoding format mark of the first grid according to the number sequence of each icons of the encoding format mark.

S204. Judge the state of the function mark in the first grid: if the function mark in the first grid is un-filled state, then perform step S205; otherwise, that is, the function mark in the first grid is filled state, then perform step S206.

S205. Convert the state of each icon of the encoding format mark in the first grid into a third set of 8-digit binary code. Based on three single-byte ASCII codes or one three-byte UTF-8 code represented by three sets of 8-digit binary code, three ASCII characters or one Unicode character corresponding to the set of graphic codes are recognized. After recognizing the characters corresponding to the set of graphical codes, the process ends.

In the computer system, eight binary digits are one byte. In order to make the computer recognize information, according to the encoding rules of national and international standards, among the 256 binary numbers composed of eight binary digits, the first 128 binary numbers having the first digit number of "0" represent the standard ASCII code. These binary codes cannot be used as the encoding of Chinese characters and other characters. Therefore, in the obtained three sets of 8-digit binary code, in a case the first digit of the first set of 8-digit binary codes is 0, the first set of 8-digit binary codes can represent one ASCII code character whose binary data is 0xxxxxxx and coded value range is U+0000 to U+007F. In a case the first digit of the first set of binary codes is "0", the first digits of the second and third sets of 8-digit binary codes in the graphical codes must also be 0, and can respectively represent one ASCII code character, that is, the three sets of 8-digit binary codes can represent three ASCII code characters. In a case the first digit is 1, the three sets of 8-digit binary codes can represent one of UTF-8 coding character (mainly Chinese characters) whose binary data are 1110xxxx, 10xxxxxx and 10xxxxxx, and the coded value range is U+0800 to U+FFFF.

In an implementation, when the first digit of each of the sets of 8-digit binary codes is 0, the set of graphical codes corresponds to the ASCII character set. Based on three ASCII codes represented by the three sets of 8-digit binary code, three ASCII characters represented by the set of graphical codes are recognized. When the high-order digit of the first set of 8-digit binary codes is 1110, the set of graphical codes corresponds to the Unicode character set and the encoding format is UTF-8. Based on the three-byte UTF-8 codes represented by the three sets of 8-digit binary code, one Unicode character represented by the set of graphical codes is recognized.

S206. According to the state of each icon of the encoding format mark in the first grid, the encoding format corresponding to the set of graphical codes is determined.

In an implementation, determining the encoding format corresponding to the set of graphical codes according to the state of each icon of the encoding format mark in the first grid includes: obtain a first corresponding relationship between the encoding format mark and the state thereof; determine the encoding format corresponding to the set of graphical codes according to the state of each icon of the encoding format mark in the first grid and the first corresponding relationship. The first corresponding relationship is set in advance according to the supported encoding format prior to preparing the answer sheet. For example, the set first corresponding relationship includes:

The function mark is filled and the icons of the encoding format mark are all un-filled, which corresponds to the GBK encoding format (the default format, and the graphical codes without function mark and encoding format mark default to the GBK format);

The function mark is filled, the No. I icon of the encoding format mark is filled and the other icons of the encoding format mark are un-filled, which corresponds to the GB18030 encoding format.

The function mark is filled, the No. II icon of the encoding format mark is filled and the other icons of the encoding format mark are un-filled, which corresponds to the UTF-8 encoding format.

The function mark is filled, the No. III icon of the encoding format mark is filled and the other icons of the encoding format mark are un-filled, which corresponds to the UTF-16BE (big-endian byte) encoding format.

The function mark is filled, the No. IV icon of the encoding format mark is filled and the other icons of the encoding format mark are un-filled, which corresponds to the UTF-16LE (little-endian byte) encoding format.

The function mark is filled, the No. V icon of the encoding format mark is filled and the other icons of the encoding format mark are un-filled, which corresponds to the BIG5 encoding format.

The function mark is filled, the No. VI icon of the encoding format mark is filled and the other icons of the encoding format mark are un-filled, which corresponds to the GB2312 encoding format.

Other encoding formats can be customized according to needs, which is not limited in the present disclosure.

Figure 9:
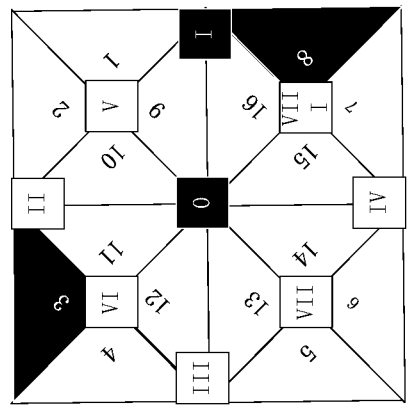
FIG. 9 is a schematic diagram of an example of the graphical codes disclosed in the embodiment of the present disclosure.
Figure 9:
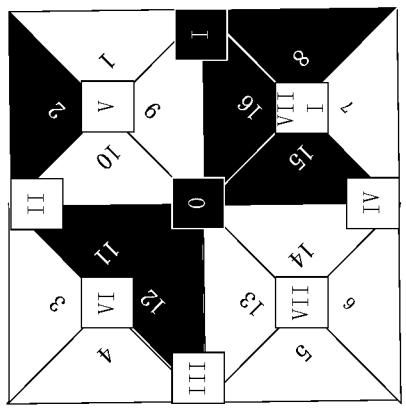
Figure 9:
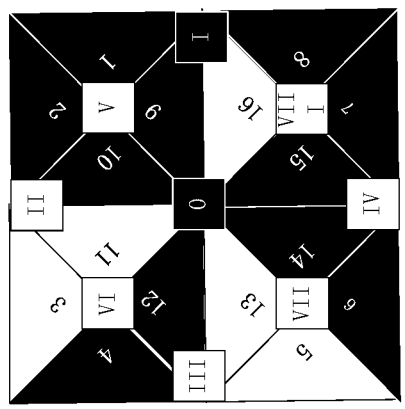

For the sake of understanding, the following are examples of the graphical codes of the characters "word", "A", "3" and "!" under each of the character sets and encoding methods: According to the GB18030 character set, the hexadecimal GB18030 codes of the characters "word", "A", "3" and "!" are respectively D7D6, 41, 33 and 21, and the corresponding binary codes are respectively 11010111 11010110, 01000001, 00110011 and 00100001. The graphical codes of the characters of "word", "A", "3" and "!" obtained by filling the blank graphical codes according to the binary codes are shown as FIG. 9. The graphical codes, from left to right in FIG. 9, successively correspond to the characters of "word", "A", "3" and "!". When graphical codes are recognized by the computer, all the graphical codes in FIG. 9 are firstly scanned into the computer. Taking the graphical code of "word" as an example, the computer first locates the graphical code, determines the top and bottom of the graphical code (consistent with the text direction by default) and each of the scanning areas, and reads out two sets of 8-digit binary codes in sequence according to the number sequence and the two states of filling and un-filling, and then compares the two sets of 8-digit binary codes with the character set stored in the computer database according to the encoding method (the default encoding mode is GBK, and GB18030 compatible with GBK) to find out the corresponding character.

Figure 10:
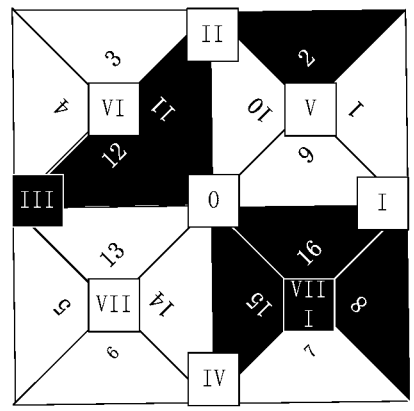
FIG. 10 is a schematic diagram of an example of another graphical code disclosed in the embodiment of the present disclosure.

According to the ASCII character set, the hexadecimal ASCII codes of the characters "A", "3" and "!" are 41, 33 and 21 respectively, and the corresponding binary codes are 01000001, 00110011 and 00100001 respectively. As abovementioned, when the function mark is un-filled, eight icons of the encoding format mark are converted into the third set of 8-digit binary code. So that, one graphical code can represent these three characters. The method is as follows: according that filling state represents the number of 1 and un-filling state represents the number of 0, the binary codes of "01000001 00110011" corresponding to "A" and "3" is successively filled in the first and second sets of 8-digit filling area of the blank graphical code; the binary codes of "00100001" corresponding to "!" is successively filled in the filling areas converted by eight icons of the encoding format mark to obtain a set of graphical codes containing three sets of 8-digit binary codes and representing three characters of "A", "3" and "!", as shown in FIG. 10. There are no Chinese characters in the ASCII character set.

According to the Unicode character set, the hexadecimal codes of the characters "word", "A", "3" and "!" are 5B57, 41, 33 and 21 respectively, and the corresponding binary codes are 01011011 01010111, 00000000 01000001, 00000000 00110011 and 00000000 00100001 respectively.

Figure 11:
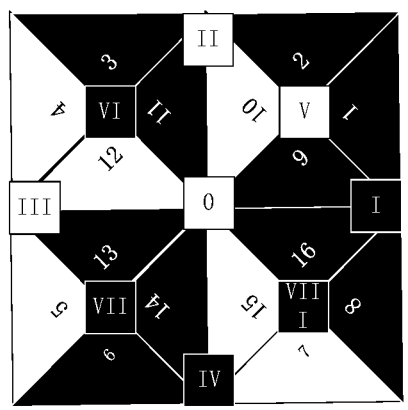
FIG. 11 is a schematic diagram of an example of another graphical codes disclosed in the embodiment of the present disclosure.
Figure 11:
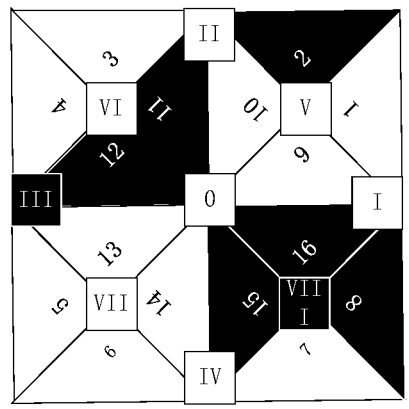

Under the UTF-8 encoding format, the number of bytes occupied by characters "word", "A", "3" and "!" is different. The "word" is a Chinese character with 3 bytes, and other characters belong to ASCII category occupying only 1 byte for each. The code of the character "word" in the Unicode character set is 5B57, the code converted to UTF-8 is E5AD97 and the corresponding binary codes thereof is 11100101 10101101 10010111. For these three sets of binary code, the first two sets fill the sixteen triangular filling areas in sequence, and the third set fills the filling areas converted by the eight icons of the encoding format mark in sequence, thus a set of graphical codes containing one graphic code and three sets of 8-digit binary codes is obtained. As UTF-8 is compatible with ASCII, each of the characters "A", "3" and "!" occupies only one byte, and their graphic codes are exactly the same as that under the ASCII encoding format, as shown in FIG. 11.

Figure 12A:
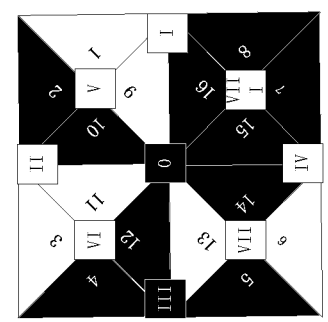
FIG. 12A and FIG. 12B are a schematic diagram of an example of another graphical codes disclosed in the embodiment of the present disclosure.
Figure 12A:
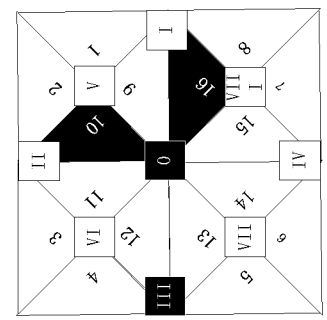
Figure 12A:
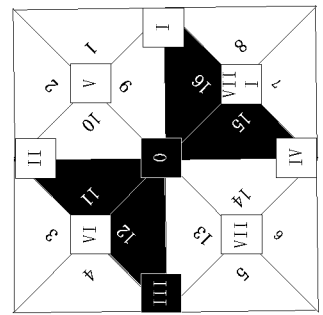
Figure 12A:
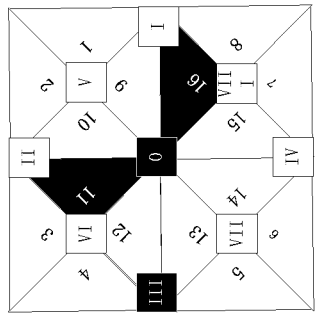

Under the UTF-16 encoding format, the UTF-16BE (big-endian byte order) encoding format: the codes of the characters "word", "A", "3" and "!" are FEFF5B57, FEFF0041, FEFF0033 and FEFF0021 respectively, and the corresponding binary codes are 0101101101010111, 0000000010000001, 0000000000110011 and 0000000000100001 respectively. The graphical codes corresponding to the characters are shown as FIG. 12A in sequence.

Figure 12B:
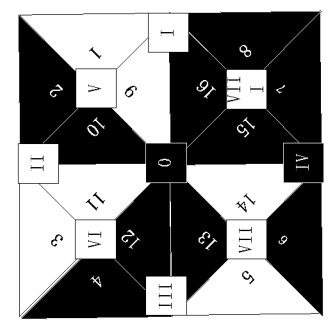
Figure 12B:
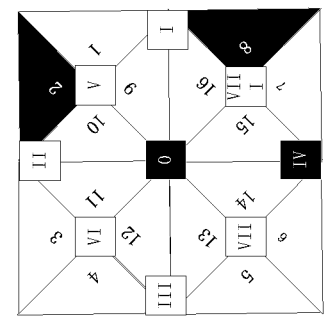
Figure 12B:
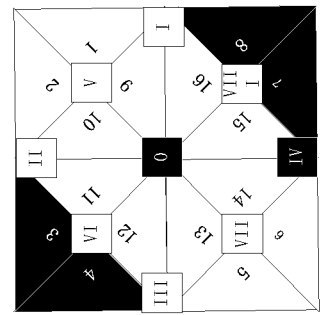
Figure 12B:
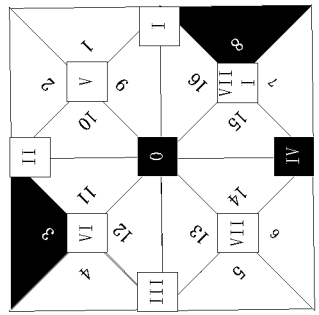

The UTF-16LE (little-endian byte order) encoding: the codes of the characters "word", "A", "3", "!" are FFFE575B, FFFE4100, FFFE3300 and FFFE2100 respectively, and the corresponding binary codes are 0101011101011011, 0100000100000000, 0011001100000000 and 0010000100000000 respectively. The graphical codes corresponding to the characters are shown as FIG. 12B in sequence.

S207. If the set of graphical codes includes one grid, a character corresponding to the set of graphical codes is recognized based on the two sets of 8-digit binary codes and the encoding format.

Whether each set of graphical codes includes one grid or two grids can be determined according to the encoding format and/or the first few digits of binary code. For example, when the encoding format is UTF-32, each set of graphical codes includes two grids; when the encoding format is GBK, each set of graphical codes includes one grid. For another example, when the encoding format is UTF-8 and the first three digits of the first set of 8-digit binary codes are 110, each set of graphical codes includes one grid; when the first five digits of the first set of 8-digit binary codes are 11110, each set of graphical codes includes two grids.

Recognizing the characters corresponding to the graphical codes based on the two sets of 8-digit binary codes and the encoding format includes:

If the encoding format encodes one character based on a single byte, two characters corresponding to the set of graphical codes are recognized based on the two coded values represented by the two sets of 8-digit binary codes under the encoding format. The encoding format of encoding one character based on a single byte includes at least one of UTF-8, ASCII and GB18030. Accordingly, the set of graphical codes can represent two single-byte Unicode characters, or two single-byte ASCII characters, or two single-byte GB18030 characters.

If the encoding format encodes one character based on double bytes, a character corresponding to the graphical codes is recognized based on the coded value represented by the two sets of 8-digit binary codes under the encoding format. The encoding format of encoding one character based on double bytes includes at least one of UTF-8, UTF 16LE (the code value range is U+0000 to U+FFFF), UTF-16BE (the code value range is U+0000 to U+FFFF), UCS-2 (the code value range is U+0000 to U+FFFF), GB18030 (the first byte code bit is from 0x81 to 0xFE, and the tail byte code bits are form 0x40 to 0x7E and 0x80 to 0xFE respectively), GBK (the code value range is 8140 to FEFE), GB2312 (the code value range is A1 A1 to FEFE), BIG5 (the code value range is A440 to F9DC). Accordingly, the set of graphical codes can represent one Unicode character, or one UCS character, or one GB18030 character, or one GBK character, or one BIG5 character.

It can be determined that the encoding format encodes one character based on single byte, double bytes, three bytes or four bytes according to the encoding format and/or the first few digits of the binary code. For examples, when the encoding format is UTF-32, one character is encoded based on four bytes; when the encoding format is GBK, one character is encoded based on double bytes. For another example, when the encoding format is UTF-8, in case that the first digit of the first set of 8-digit binary codes is 0, one character is encoded based on a single byte; in case that the first three digits of the first set of 8-digit binary codes are 110, one character is encoded based on double bytes; in case that the first four digits of the first set of 8-digit binary codes are 1110, one character is encoded based on three bytes; and, in case that the first five digits of the first set of 8-digit binary codes are 11110, one character is encoded based on four bytes.

S208. If the set of graphical codes includes two grids, the states of the filling areas in the second grid of the set of graphical codes are read according to the number sequence of the filling areas to obtain another two sets of 8-digit binary codes composed of 16 digits; based on the encoding format and the four sets of 8-digit binary codes composed of the two sets of 8-digit binary codes and said another two sets of 8-digit binary codes, a character corresponding to the set of graphical codes is recognized.

Some rarely-used Chinese characters cannot be encoded with two bytes. In order to recognize these characters through graphical codes, the embodiment of the present disclosure adopts four sets of 8-digit binary codes represented by a set of graphical codes having two grids, that is, four bytes. In specific implementation, when the high-order digits of the first set of 8-digit binary codes in the set of graphical codes is "11110" or "110110", the first grid in the set of graphical codes must be combined with the immediately following second grid so as to represent one Unicode character with four bytes. Based on the encoding format and the four sets of 8-digit binary codes composed of the two sets of 8-digit binary codes and another two sets of binary code, recognizing a character corresponding to the set of graphical codes, includes:

If the encoding format encodes one character based on double bytes, one character corresponding to the set of graphical codes is recognized based on the coded value represented by the four sets of 8-digit binary codes under the encoding format. The encoding format encoding one character based on four bytes includes at least one of UTF-8 (the binary data is 11110xxx, 10xxxxxx, 10xxxxxx and 10xxxxxx, and the coded value ranges from U+10000 to U+10FFFF), UTF-16BE (the binary data is 110110xxxxxx 110111xxxxxxxxx, and the coded value ranges from 0000 to 10FFFF), UTF-16LE (the binary data is 110110110xxxxxxxxx and 110111xxxxxxxxx, and the coded value ranges from 0000 to 10FFFF), UTF-32BE (the coded value ranges from 0000 to 10FFFF), UTF-32LE (the coded value ranges from 0000 to 10FFFF), UCS-4 (the coded value ranges from 0000 to 10FFFF), and GB18030 (the coded value ranges from 0x81308130 to 0xFE39FE39). Accordingly, the set of graphical codes can represent one Unicode character, one UCS character, or one GB18030 character.

The technical solutions in the embodiments of the present disclosure have the following beneficial effects:

1. The computer method for recognizing an answer sheet provided by the present disclosure graphically encodes characters. The object of filling characters such as Chinese characters can be achieved by filling the filling areas in the graphical codes, so that the characters such as Chinese characters in the name and subjective answers can be filled in the answer sheet. The computer recognizes the graphical codes to obtain the character encoding represented by the graphical codes so as to determine the characters filled in the answer sheet. The present disclosure realizes automatic computer recognition of the characters in the answer sheet, which expands the function of answer sheet and also facilitates the automatic recordation and summary of the examinee's scores after automatic marking by computer.

2. The graphical codes in the present disclosure has a compact structure. Each of the filling areas in filled or un-filled state is an effective graphic space occupation. Compared with other answer sheets (such as including four options of a single choice question, in fact, only one filling area is effective and other three filling areas are invalid), the graphical codes in the present disclosure have no invalid filling area occupation, improving the information capacity of an answer sheet and avoiding paper waste.

3. The answer sheet provided in the embodiments of the present disclosure supports a variety of encoding formats. When filling, users can fill in the corresponding encoding format mark with their familiar encoding format, and then fill the characters according to the corresponding encoding format. In addition, in practical application, applicable character set and encoding method are firstly determined according to the use object, and blank graphical codes with the same function mark and encoding format mark are formulated. The answer sheet includes several sets of blank graphical codes and can be used with any encoding format. When filling the answer sheet, the character code of the character to be filled is found according to the encoding format, the corresponding code of the character is determined according to the encoding format, and then the code is converted into a binary code. Based on the binary code, the corresponding filling area in the graphical code is filled according to the number of the filling area. Finding the code corresponding to a character to be filled in according to the encoding format is similar to the process of looking up a dictionary, which is simple and easy to master. Therefore, the user can fill an answer sheet quickly. Moreover, the graphical codes in the present disclosure can cover most common characters and have a wide range of application.

The following is a further illustration of the computer method for recognizing an answer sheet provided by the present disclosure in combination with the embodiments.

Embodiment 1: the answer sheet including a name represented by graphical codes.

Figure 13:
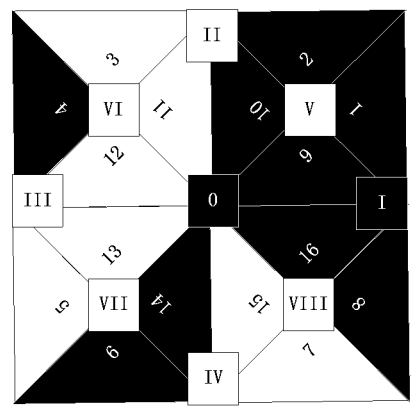
FIG. 13 is a schematic diagram of an example of another graphical codes disclosed in the embodiment of the present disclosure.
Figure 13:
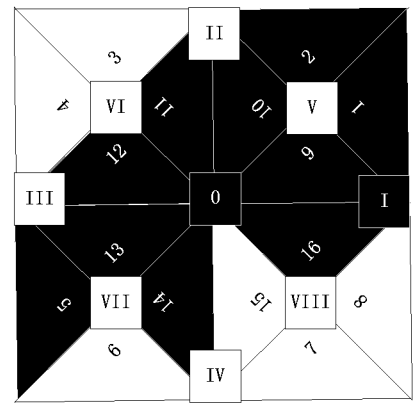

FIG. 13 shows two sets of graphical codes filled with the name "Chinese characters for 'Zhang San'". Each set of graphical codes includes a grid which is a square divided into 16 triangular areas by two diagonal lines, two center lines and four midpoint connecting lines connecting the midpoints of four sides of the grid, and each of the triangular areas is a filling area. Each set of graphical codes further includes an encoding format mark and a function mark. The encoding format mark includes eight small square icons numbered in sequence and respectively located at four midpoints of the four sides of the first grid and at four intersections of the four midpoint connecting lines and the two diagonal lines. The function mark is a small square icon located at the center of the grid.

The steps of the machine recognizing the answer sheet include:

The filled answer sheet including two sets of graphical codes is read. Each set of graphical codes in the answer sheet is located.

For the first set of graphical codes, two sets of 8-digit binary codes of "11010101 11000101" are obtained. The first digit of the first set of 8-digit binary codes is 1, the function mark is in filled state, the No. I icon of the encoding format mark is filled and the rest icons are in the un-filled state. Thus, the encoding format is determined as GB18030, the number of bytes indicating the character is two, so as to recognize the first character "Chinese character for 'Zhang'" based on the double-byte GB18030 coded value of "11010101 11000101".

For the second set of graphical codes, two sets of 8-digit binary codes "11001000 11111101" are obtained. The first digit of the first set of 8-digit binary codes is 1, the function mark is in the filled state, the No. I icon of the encoding format mark is filled and the rest icons are in the un-filled state. Thus, the encoding format is determined as GB18030, the number of bytes indicating the character is two, so as to recognize the second character "三 (San)" based on the double-byte GB18030 coded value of "11010101 11000101".

Embodiment 2: the answer sheet including a name represented by graphical codes and any one of the objective question options "A, B, C, D" represented by graphical codes.

Figure 14:
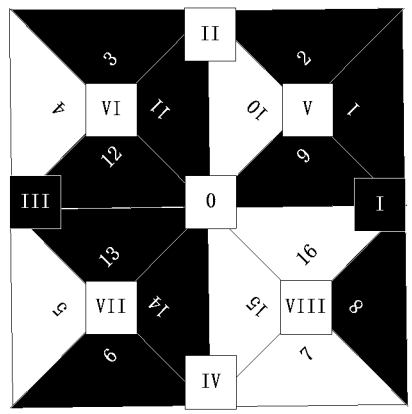
FIG. 14 is a schematic diagram of an example of another graphical codes disclosed in the embodiment of the present disclosure.
Figure 14:
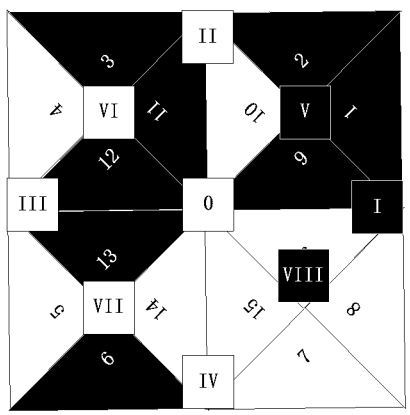
Figure 14:
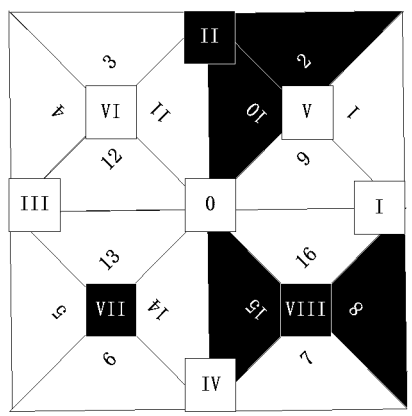

FIG. 14 shows three sets of graphical codes filled with the name of "Chinese characters for 'Zhang San'" and the objective question option "A". Each set of graphical codes includes a grid which is a square divided into 16 triangular areas by two diagonal lines, two center lines and four midpoint connecting lines connecting the midpoints of four sides of the grid, and each of the triangular areas is a filling area. Each set of graphical codes further includes an encoding format mark and a function mark. The encoding format mark includes eight small square icons numbered in sequence and respectively located at four midpoints of the four sides of the first grid and at four intersections of the four midpoint connecting lines and the two diagonals. The function mark is a small square icon located at the center of the first grid.

The steps of the machine recognizing the answer sheet include:

The filled answer sheet including three sets of graphical codes is read. Each set of graphical codes in the answer sheet is located.

For the first set of graphical codes, two sets of 8-digit binary codes of "11100101 10111100" are obtained. The function mark is in un-filled state, and a third set of 8-digit binary codes of "101000000" is obtained according to the un-filled state of the encoding format mark. The high-order digit of the first set of 8-digit binary codes is "1110", meaning that the set of graphical codes is composed of three bytes (there are several "1" in front of "0", then there are several bytes in the set of graphical codes, and its binary data is "1110xxxx; 10xxxxxx; 10xxxxxx"). The first character "Chinese characters for 'Zhang'" is recognized based on the UTF-8 codes of "11100101 10111100 101000000" represented by three sets of 8-digit binary codes.

For the second set of graphical codes, two sets of 8-digit binary codes of "11100100 10111000" are obtained. The function mark is in un-filled state, and a third set of 8-digit binary codes of "10001001" is obtained according to the un-filled state of the encoding format mark. The first digit of the first set of 8-digit binary codes is 1, and the second character "三 " (San) is recognized based on the UTF-8 codes of "11100100 10111000 10001001" represented by the three sets of 8-digit binary codes.

For the third set of graphical codes, two sets of 8-digit binary codes of "01000001 01000010" are obtained. The function mark is in un-filled state, and a third set of 8-digit binary codes of "01000011" is obtained according to the un-filled state of the encoding format mark. The first digit of all three sets of 8-digit binary codes is 0, and the characters A, B and C are recognized based on the ASCII codes of "01000001 01000010 01000011".

Finally, it should be noted that in the present invention, relational terms, such as "first" and "second" and the like, are solely used to distinguish one entity or operation from another entity or operation, without necessarily requiring or implying any actual such relationship or order between such entities or operations. Moreover, the terms of "comprise", "include" or any other variation thereof are intended to cover non-exclusive inclusion, so that a process, method, article or apparatus that includes a list of elements does not include only those elements but may include other elements not expressly listed or inherent to such process, method, article or apparatus. Without more restrictions, the elements defined by the statement of "including one . . . " does not exclude other identical elements in the process, method, article or apparatus that includes the element.

Each embodiment in the present invention is described in a progressive manner. Each embodiment focuses on the differences from other embodiments. The same or similar parts between the various embodiments can be referred to each other.

The above illustration of the disclosed embodiments enables those skilled in the art to realize or use the present invention. Various modifications to these embodiments will be apparent to those skilled in the art, and the general principles defined herein can be implemented in other embodiments without departing from the spirit or scope of the present invention. Therefore, the present invention will not be limited to these embodiments shown herein, but will conform to the widest scope consistent with the principles and novel features disclosed herein.

The invention claimed is:

1. A computer method for recognizing an answer sheet, comprising:

reading a filled answer sheet comprising at least one set of graphical codes, wherein each set of graphical codes comprises at least one grid which is a divided square, wherein the divided square is divided, by two diagonal lines, two center lines, and four midpoint connecting lines connecting midpoints of four sides of the grid, into 16 triangular areas numbered in sequence, wherein each of the 16 triangular areas is a filling area and each filling area has a filled state and a un-filled state;

locating each set of graphical codes in the answer sheet;

reading, for each set of graphical codes, the state of each of the filling areas in a first grid of the set of graphical codes according to a number sequence of the filling areas, and obtaining, by means of representing the filled state as 1 and the un-filled state as 0, two sets of 8-digit binary codes composed of 16 digits;

determining an encoding format corresponding to the graphical codes; and recognizing, based on at least the two sets of 8-digit binary codes and the encoding format, a character corresponding to the set of graphical codes, wherein each of the grids further comprises an encoding format mark and a function mark, wherein the encoding format mark comprises eight icons numbered in sequence and respectively located at four midpoints of four sides of the grid and at four intersections of the four midpoint connecting lines and the two diagonal lines, wherein the encoding format mark has a filled state and a un-filled state, wherein the function mark is an icon located at a center of the grid and has a filled state and a un-filled state;

wherein, for each set of graphical codes, after reading the state of each of the filling areas in the first grid in the set of graphical codes according to the number sequence of the filling areas, further comprises: reading the state of the function mark of the first grid, and reading, according to the number sequence of the icons of the encoding format mark, the state of each icon of the encoding format mark of the first grid;

wherein the step of determining the encoding format corresponding to the graphical codes comprises:

when the function mark in the first grid is un-filled, the encoding format corresponding to the set of graphical codes is ASCII or UTF-8;

when the function mark of the first grid is filled, the encoding format corresponding to the set of graphical codes is determined according to the state of each icon of the encoding format mark in the first grid;

wherein the step of recognizing, based on at least two sets of 8-digit binary codes and the encoding format, a character corresponding to each of the graphical codes comprises:

when the function mark of the first grid is un-filled, the states of icons of the encoding format mark in the first grid are converted to a third set of 8-digit binary code, and based on three single-byte ASCII codes or one three-byte UTF-8 code represented by three sets of 8-digit binary code, three ASCII characters or one Unicode character corresponding to the set of graphical codes are recognized; and when the function mark of the first grid is filled, when each set of graphical codes comprises one grid, based on the two sets of 8-digit binary codes and the encoding format, a character corresponding to the set of graphical codes is recognized; when each set of graphical codes comprises two grids, according to a number sequence of the filling areas, the states of the filling areas in a second grid of the set of graphical codes are read so as to obtain another two sets of 8-digit binary codes composed of 16 digits; and based on the encoding format and four sets of 8-digit binary codes composed of the two sets of 8-digit binary codes and another two sets of 8-digit binary codes, a character corresponding to the set of graphical codes is recognized.

2. The computer method for recognizing an answer sheet according to claim 1, wherein determining the encoding format corresponding to the graphical codes comprises:

taking a default encoding format as the encoding format corresponding to the graphical code, wherein the default encoding format is GBK.

3. The computer method for recognizing an answer sheet according to claim 1, wherein the step of recognizing, based on three single-byte ASCII codes or one three-byte UTF-8 code represented by three sets of 8-digit binary code, three ASCII characters or one Unicode character corresponding to the set of graphical codes comprises:

when a first digit of each set of 8-digit binary codes is 0, the set of graphical codes corresponds to ASCII character set, and three ASCII characters corresponding to the set of graphical codes are recognized based on the three ASCII codes represented by the three sets of 8-digit binary code; and when high-order digit of the first set of 8-digit binary codes is 1110, the set of graphical codes corresponds to Unicode character set and the encoding format is UTF-8; and one Unicode character corresponding to the set of graphical codes is recognized based on the three-byte UTF-8 code represented by the three sets of 8-digit binary code.

4. The computer method for recognizing an answer sheet according to claim 1, wherein the step of determining, according to the state of each icon of the encoding format mark in the first grid, the encoding format corresponding to the graphical codes comprises:

obtaining a first relationship between the state of the encoding format mark and the encoding format; and determining, according to the state of each icon of the encoding format marks in the first grid and the first relationship, the encoding format corresponding to the graphical codes.

5. The computer method for recognizing an answer sheet according to claim 1, wherein the step of recognizing, based on the two sets of 8-digit binary codes and the encoding format, a character corresponding to the set of graphical codes comprises:

when the encoding format encodes one character based on a single byte, based on an encoding value under the encoding format represented by each set of 8-digit binary code, two characters corresponding to the set of graphical codes are recognized; and when the encoding format encodes one character based on double bytes, based on an encoding value under the encoding format represented by the two sets of 8-digit binary code, one character corresponding to the set of graphical codes is recognized.

6. The computer method for recognizing an answer sheet according to claim 5, wherein,
the encoding format of encoding one character based on a single byte comprises at least one of ASCII, UTF-8, and sing-byte GB18030; and
the encoding format of encoding one character based on double bytes comprises at least one of UTF-8, UTF-16LE, UTF-16BE, UCS-2, ANSI, double-byte GB18030, GBK, GB2312, and BIG5.

7. The computer method for recognizing an answer sheet according to claim 1, wherein the step of recognizing, based on the encoding format and four sets of 8-digit binary codes composed of the two sets of 8-digit binary codes and another two sets of 8-digit binary code, a character corresponding to the set of graphical codes comprises:
when the encoding format encodes one character based on four bytes, based on an encoding value under the encoding format represented by the four sets of 8-digit binary codes composed of the two sets of 8-digit binary codes and another two sets of 8-digit binary code, one character corresponding to the set of graphical codes is recognized,
wherein the encoding format of encoding one character based on four bytes comprises at least one of UTF-8, UTF-16BE, UTF-16LE, UTF-32BE, UTF-32BE, UCS-4, and four-byte GB18030.

8. The computer method for recognizing an answer sheet according to claim 1, wherein the grid further comprises a direction mark for locating top and bottom of the graphical code, wherein the direction mark comprises four icons numbered in sequence and located at four corners of the grid;
wherein the step of reading the state of each of the filling areas in the first grid of the set of graphical codes according to the number sequence of the filling areas comprises:
reading, according to the number sequence of the direction marks, the state of each icon of the direction mark in the first grid in sequence;
determining, according to the state of each of the direction marks, the top and bottom of the first grid; and
reading, according to the top and bottom of the first grid, the state of each of the filling areas in the first grid in sequence.

9. The computer method according for recognizing an answer sheet to claim 8, wherein the direction mark is square, triangle, or other shapes that play a role of identification.

10. The computer method for recognizing an answer sheet according to claim 1, wherein the encoding format mark is square, triangle, circle, or other shapes that play a role of identification.

11. The computer method for recognizing an answer sheet according to claim 1, wherein the function mark is square, triangle, circle, or other shapes that play a role of identification.

12. The computer method for recognizing an answer sheet according to claim 1, wherein the graphic code is a circle evenly divided into 16 fan-shaped areas or a deformed grid.

* * * * *